United States Patent
Kobilarov et al.

(10) Patent No.: US 12,441,308 B2
(45) Date of Patent: Oct. 14, 2025

(54) ACTIVE PREDICTION BASED ON OBJECT TRAJECTORIES

(71) Applicant: Zoox, Inc., Foster City, CA (US)

(72) Inventors: Marin Kobilarov, Baltimore, MD (US); Lichao Ma, Santa Clara, CA (US); Chonhyon Park, San Jose, CA (US); Matthew Van Heukelom, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 147 days.

(21) Appl. No.: 18/376,766

(22) Filed: Oct. 4, 2023

(65) Prior Publication Data
US 2024/0025399 A1    Jan. 25, 2024

Related U.S. Application Data

(63) Continuation of application No. 17/351,642, filed on Jun. 18, 2021, now Pat. No. 11,851,054.

(51) Int. Cl.
*B60W 30/095* (2012.01)
*B60W 30/18* (2012.01)
*B60W 60/00* (2020.01)

(52) U.S. Cl.
CPC .. *B60W 30/0956* (2013.01); *B60W 30/18159* (2020.02); *B60W 60/00274* (2020.02); *B60W 2552/05* (2020.02); *B60W 2554/4044* (2020.02); *B60W 2555/60* (2020.02)

(58) Field of Classification Search
None
See application file for complete search history.

(56) References Cited

U.S. PATENT DOCUMENTS

| | | |
|---|---|---|
| 2013/0261952 A1 | 10/2013 | Aso et al. |
| 2018/0141544 A1 | 5/2018 | Xiao et al. |
| 2019/0152490 A1* | 5/2019 | Lan .................. B60W 30/0956 |
| 2019/0243371 A1 | 8/2019 | Nister et al. |
| 2020/0023836 A1 | 1/2020 | Schneider et al. |
| 2020/0249674 A1* | 8/2020 | Dally .................. G05D 1/0221 |
| 2020/0339116 A1 | 10/2020 | Xu et al. |

(Continued)

FOREIGN PATENT DOCUMENTS

| | | |
|---|---|---|
| DE | 102019216235 A1 | 4/2021 |
| JP | 2010228740 A | 10/2010 |

(Continued)

OTHER PUBLICATIONS

Office Action for Japanese Application No. 2023-577921, Dated Dec. 3, 2024, 9 pages.

(Continued)

*Primary Examiner* — Ryan Rink
(74) *Attorney, Agent, or Firm* — Lee & Hayes, P.C.

(57) ABSTRACT

Techniques for accurately predicting and avoiding collisions with objects detected in an environment of a vehicle are discussed herein. A vehicle computing device can implement a model to output data indicating costs for potential intersection points between the object and the vehicle in the future. The model may employ a control policy and a time-step integrator to determine whether an object may intersect with the vehicle, in which case the techniques may include predicting vehicle actions by the vehicle computing device to control the vehicle.

19 Claims, 6 Drawing Sheets

(56) References Cited

U.S. PATENT DOCUMENTS

| | | |
|---|---|---|
| 2020/0409352 A1 | 12/2020 | Caldwell et al. |
| 2021/0122373 A1 | 4/2021 | Dax |
| 2021/0124353 A1 | 4/2021 | Dally et al. |
| 2021/0149404 A1 | 5/2021 | Zeng et al. |
| 2022/0402485 A1 | 12/2022 | Kobilarov et al. |

FOREIGN PATENT DOCUMENTS

| | | |
|---|---|---|
| JP | 2012048642 A | 3/2012 |
| JP | 2018138402 A | 9/2018 |
| JP | 2019194073 A | 11/2019 |
| JP | 2021014257 A | 2/2021 |
| JP | 2021504812 A | 2/2021 |
| JP | 2022550512 A | 12/2022 |
| KR | 101795250 B1 | 11/2017 |

OTHER PUBLICATIONS

Office Action for U.S. Appl. No. 17/351,642, mailed on Jul. 3, 2023, Marin Kobilarov, "Active Prediction Based on Object Trajectories", 15 pages.
Office Action for U.S. Appl. No. 17/351,642, mailed on Mar. 10, 2023, Kobilarov, "Active Prediction Based on Object Trajectories", 14 Pages.
The PCT Search Report and Written Opinion mailed Sep. 21, 2022 for PCT application No. PCT/US2022/032728, 11 pages.
Office Action for U.S. Appl. No. 17/351,642, malled on Jul. 3, 2023, Kobllarov, "Active Prediction Based on Object Trajectories", 15 pages.
Office Action for Japanese Application No. 2023-577921, Dated May 27, 2025, 8 pages.
Search Report for European Application No. 22825556.8, Dated Mar. 7, 2025, 10 pages.

\* cited by examiner

ACTIVE PREDICTION BASED ON OBJECT TRAJECTORIES

PRIORITY APPLICATION

This application is a continuation of and claims priority to U.S. patent application Ser. No. 17/351,642, filed Jun. 18, 2021, titled "ACTIVE PREDICTION BASED ON OBJECT TRAJECTORIES," the entirety of which is incorporated herein by reference.

BACKGROUND

Planning systems in autonomous and semi-autonomous vehicles determine actions for a vehicle to take in an operating environment. Actions for a vehicle may be determined based in part on avoiding objects present in the environment. For example, an action may be generated by a planning system to yield to a pedestrian, to change a lane to avoid another vehicle in the road, or the like. Perception systems utilize sensor data from sensors to "see" the environment which enables the planning systems to determine an effect of a detected object on a potential action for the vehicle. However, the complexity of such systems may preclude inspection of the reliability of such systems, especially as applied in ever more complicated scenarios.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
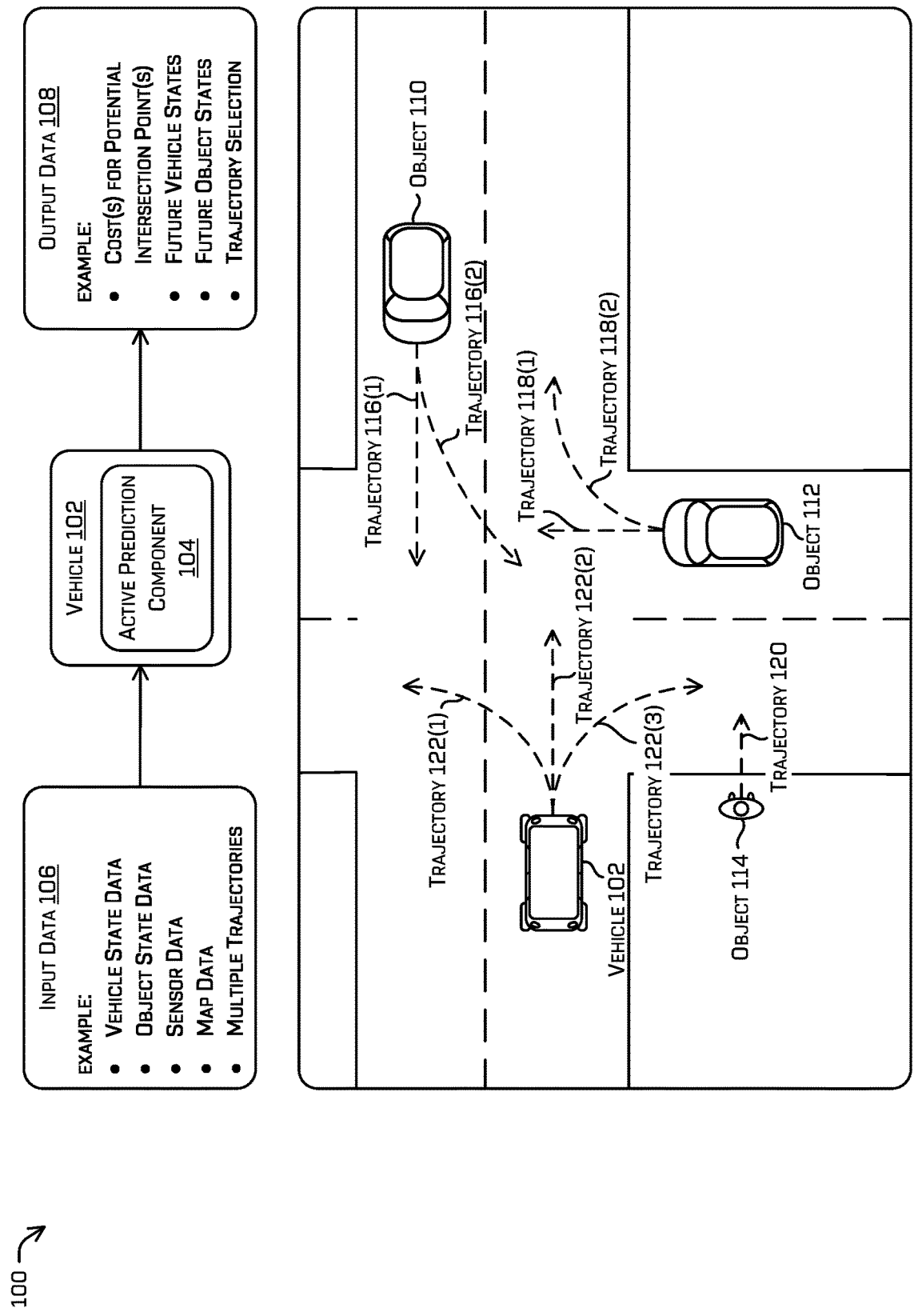
FIG. 1 is an illustration of an example environment, in which an example vehicle applies a model to predict an intersection value indicating a likelihood for collision with one or more example objects.

Techniques for predicting trajectories of objects and/or a vehicle based on potential interactions with other objects are discussed herein. The techniques can include a vehicle computing device that implements a model to determine realistic interactions between multiple objects and improve processing when determining an action for an autonomous vehicle. For instance, the model may receive a set of predicted object trajectories associated with an object and receive and/or determine a vehicle trajectory and determine a predicted intersection between the object trajectories and/or the vehicle trajectory based predicted trajectories associated with the object, and determine potential actions for the autonomous vehicle to avoid the objects based on a control policy. In various examples, the model may also determine costs for each vehicle action for controlling the autonomous vehicle. By implementing the techniques describes herein, future states of the object(s) and vehicle can be accurately and efficiently processed and identified, thereby improving the overall safety of the vehicle.

Generally, the model (e.g., an active prediction component) implemented by the vehicle computing device may provide functionality to determine interactions between a vehicle (or an object) and another object in an environment in the future. For example, the model can determine objects that are most likely to intersect with a vehicle trajectory in the future based on identifying intersections between object trajectories and a vehicle trajectory. Further, the model can predict future states of the vehicle relative to object trajectories based at least in part on a control policy (e.g., information identifying rules of the road between objects and/or the vehicle). The future states can represent an action taken by the vehicle for different times in the future. In some examples, the vehicle can be controlled in an environment based at least in part on the data output by the model.

In some examples, a prediction component can determine predicted trajectories associated with object(s) in an environment. For example, in an environment with a vehicle (such as an autonomous vehicle), a first object, and a second object, the prediction component may determine predicted trajectories associated with each object. Further, a planning system may determine a number of potential actions associated with the vehicle. In some cases, the predicted trajectories can be based on map data and possible actions associated with the objects. However, if an object follows a first predicted trajectory (or the vehicle takes a first action) it may affect the behavior of other objects in an environment. Accordingly, techniques include determining some or all pairwise combinations of trajectories for vehicle/object pairs or object/object pairs and determining potential interactions (e.g., intersections) associated with such pairs (or a selected subset thereof). An environment can be simulated and predicted trajectories of object(s) and/or possible actions can be updated or otherwise adjusted to account for the potential interactions of the object(s) and/or vehicle, which can provide for more accurate predictions and simulations of objects in an environment.

In some examples, the model may determine which of multiple objects will reach an intersection point with the vehicle first based on object state data associated with each object and vehicle state data associated with the vehicle. For example, the model can receive the object state data (e.g., position data, orientation data, heading data, velocity data, speed data, acceleration data, yaw rate data, or turning rate data associated with the object) and/or the vehicle state data (e.g., position data, orientation data, heading data, velocity data, speed data, acceleration data, yaw rate data, or turning rate data associated with the vehicle) from a perception component of the vehicle that uses one or more sensors to detect and predict objects surrounding an environment of the vehicle. In various examples, the model can receive sensor data, map data, or other input data and identify the interactions between two or more objects and/or interactions between an object and the vehicle. In examples of intersection(s) that are predicted between two objects, the model can identify the object that reaches an intersection point with the vehicle first based on dynamics, kinematics, and/or a grid, and predict actions for the vehicle (e.g., a steering action, an acceleration action, and the like) to avoid the object(s) most likely to interact with the vehicle.

In some examples, the techniques described herein can include implementing a model to determine intersection information usable by a vehicle computing device to control a vehicle (e.g., control steering, braking, acceleration, and so on). For instance, the vehicle computing device can receive the intersection information from the model for use in planning operations, such as determining a candidate trajectory for the vehicle. In various examples, the vehicle may receive indications of potential intersection(s) with object(s) usable by the vehicle to quickly and/or preemptively avoid objects or update predicted trajectories of objects, thereby improving safety of the vehicle. Further, aspects of the processing operations may be parallelized and input to a parallel processor unit (such as a GPU) for efficient processing. Accordingly, implementing the techniques described herein can efficiently make use of available computational resources (e.g., memory and/or processor allocation or usage) while also improving accuracy of predictions.

In various examples, the model may determine a predicted intersection between the objects and the vehicle based at least in part on an occupancy grid comprising a plurality of grid points representing discretized portions (which may otherwise be referred to as pixels herein) in the environment. In various examples, the model can process the object state data, the vehicle state data, sensor data, map data, or other input data to determine potential actions by the vehicle that avoids intersecting with the objects (e.g., the future object states and future vehicle stares can be determined in parallel by one or more GPUs). Additional details for determining potential intersections are described herein, including in relation to FIGS. 2 and 3.

In some examples, the vehicle may comprise an autonomous or semi-autonomous vehicle with a vehicle computing device configured to receive sensor data from one or more sensors of the vehicle. The vehicle may detect objects using one or more sensors while navigating in the environment. The objects may include static objects (e.g., ground level, buildings, bridges, signs, etc.) and dynamic objects such as other vehicles (e.g., cars, trucks, motorcycles, mopeds, etc.), pedestrians, bicyclists, or the like. In some examples, the objects may be detected based on sensor data from sensors (e.g., cameras, motion detectors, lidar sensors, radar sensors, etc.) of the vehicle. As yet another example, the objects may be detected based on sensor data received from remote sensors, such as, for example, sensors associated with another vehicle or sensors situated in the environment that are configured to share data with a plurality of vehicles. Sensor data representing the detected objects may be used to determine input data usable by the model to predict an intersection probability associated with the object.

In some examples, a number of pairwise combinations of object trajectories and/or object actions can be large. For example, a case where three actions are considered for a vehicle and three trajectories are considered for an object can include nine possible combinations. In some examples, potential interactions for such combinations can be determined in parallel by implementing processing in a parallel processor such as a GPU and/or in parallel by multiple GPUs thereby more efficiently processing the potential interactions in real-time.

In some examples, a model may define processing resources (e.g., processor amount, processor cycles, processor cores, processor location, processor type, and the like) to use to predict intersection probabilities associated with a potential intersection with the vehicle. A vehicle computing device that implements a model may have different processors (e.g., Central Processing Units (CPUs), Graphics Processing Units (GPUs), multi-core processor, and the like). Models may define processing resources to utilize a processor that most efficiently (e.g., uses the least amount of computational time) outputs a prediction. In some examples, models may predict intersection values by processing data associated with the object and/or the vehicle using a GPU, CPU, or a combination thereof. In this way, the model may be defined to utilize the processing resources that enable the model to perform predictions in the least amount of time (e.g., to use the intersection values in planning considerations of the vehicle). Accordingly, a model may make the best use of available processing resources and enable more predictions that may improve how a vehicle navigates in relation to the objects.

As described herein, models may be representative of machine learned models, statistical models, or a combination thereof. That is, a model may refer to a machine learning model that learns from a training data set to improve accuracy of an output (e.g., a prediction). Additionally or alternatively, a model may refer to a statistical model that is representative of logic and/or mathematical functions that generate approximations which are usable to make predictions.

The techniques discussed herein can improve a functioning of a computing device of a vehicle in a number of ways. For example, the model may identify which objects to process in an environment to prevent unneeded actions by the vehicle, and/or improves predictions related to the behavior of the vehicle. In some examples, the model improves functioning and safety of the vehicle by preventing the vehicle from taking additional actions that are not required based on conditions in the environment around the vehicle. In addition, the techniques described herein can improve passenger comfort and/or vehicle safety such as, for example, avoiding sudden braking or swerving when not needed. The techniques can include the model optimizing available computational resources by performing operations that limit the impact on the available resources (as compared to not implementing the model). Utilizing output data from the model by a vehicle computing device, for instance, can improve the accuracy and/or reduce a latency for the vehicle to respond to a potential collision in the environment.

In various examples, implementing the model can improve safety of a vehicle by outputting an indication of multiple predicted trajectories associated with one or more objects in the future. For example, a route or trajectory (e.g., a candidate trajectory) determined for the vehicle can be based at least in part on consideration of the multiple predicted trajectories of each object. In some examples, multiple trajectories of multiple objects can be processed by the model to identify which object and associated trajectories are most likely to interact with the vehicle thereby enabling a planning component to select the route or trajectory for the vehicle that is most likely to avoid the object. By implementing the model, consideration to multiple object trajectories, and potential actions by each object and/or potential actions by the vehicle over time in a simulation, can be determined in substantially real-time before a safest possible route is determined for the vehicle to follow.

The techniques described herein can be implemented in a number of ways. Example implementations are provided below with reference to the following figures. Although discussed in the context of an autonomous vehicle, the methods, apparatuses, and systems described herein can be applied to a variety of systems and is not limited to autonomous vehicles. In another example, the techniques can be utilized in an aviation or nautical context, or in any system using sensor data. Additionally, the techniques described herein can be used with real data (e.g., captured using sensor(s)), simulated data (e.g., generated by a simulator), or any combination of the two.

FIG. 1 is an illustration of an autonomous vehicle (vehicle 102) in an environment 100, in which an example prediction model (active prediction component 104) may receive input data 106 and determine output data 108. A vehicle computing device (e.g., vehicle computing device 404) and/or a remote computing device (e.g., computing device(s) 436) may implement the active prediction component 104 of the vehicle 102. While described as a separate system, in some examples, prediction techniques described herein may be implemented by other vehicle systems, components, and/or computing devices. For example, and as will be described in further detail with regard to FIG. 4, the intersection prediction techniques described herein may be implemented at least partially by or in association with a localization component 420, a perception component 422, a prediction component 424, and/or a planning component 426.

In some examples, the input data 106 can comprise one or more of: vehicle state data, object state data, sensor data, map data, predicted object trajector(ies), and/or predicted vehicle trajector(ies). For instance, the active prediction component 104 can receive the input data 106 (e.g., the predicted object trajectories, a predicted vehicle trajectory, an object position, a vehicle position, and so on) and generate the output data 108 representing cost(s) for one or more intersection point(s) between the objects and the vehicle in the environment 100. In such an example, the active prediction component 104 may receive input data representing object state data (e.g., position data, orientation data, heading data, velocity data, speed data, acceleration data, yaw rate data, or turning rate data associated with the object) and/or vehicle state data (e.g., position data, orientation data, heading data, velocity data, speed data, acceleration data, yaw rate data, or turning rate data associated with the vehicle). In various examples, the active prediction component 104 can receive map data representing static features of the environment 100 (which, in at least some examples, may also comprise designations for lane markings, lane speed, road control information—e.g., stop signs, traffic signals, crosswalks, school zones, speed bumps, and the like).

In various examples, the active prediction component 104 can determine the output data 108 while the vehicle 102 navigates in the environment 100. For example, the output data 108 may represent a future state(s) of one or more objects or the vehicle 102 for different times in the future as the vehicle 102 navigates to a destination in the environment 100. In various examples, the active prediction component 104 can receive the input data 106 from one or more components of the vehicle computing device and/or computing device(s) remote from the vehicle 102 and may determine actions associated with one of multiple potential trajectories associated with the input data 106.

In various examples, the vehicle computing device associated with the active prediction component 104 may be configured to receive sensor data representing object(s) of the environment 100, such as via a perception component (e.g., the perception component 422). In some examples, the vehicle computing device may detect, infer, estimate, or otherwise determine object state data representing characteristics of the object in the environment 100. For example, such object state data may comprise position, velocity, acceleration, size, semantic type, etc. In some examples, the sensor(s) may include sensors mounted on the vehicle 102, and may include, without limitation, ultrasonic sensors, radar sensors, light detection and ranging (lidar) sensors, cameras, microphones, inertial sensors (e.g., inertial measurement units, accelerometers, gyros, etc.), global positioning satellite (GPS) sensors, and the like. In some examples, the sensor(s) may include one or more remote sensors, such as, for example, sensors mounted on another autonomous vehicle, and/or sensors mounted in the environment 100. In various examples, the vehicle 102 may be configured to transmit and/or receive data from other autonomous vehicles. The data may include sensor data and/or state data, such as sensor data associated with the environment 100. Additional examples of determining object state data and vehicle state data based on sensor data can be found in U.S. patent application Ser. No. 16/151,607, filed on Oct. 4, 2018, entitled "Trajectory Prediction on Top-Down Scenes," which is incorporated herein by reference in its entirety and for all purposes. Additional examples of tracking objects can be found in U.S. patent application Ser. No. 16/147,328, filed on Sep. 28, 2018, entitled "Image Embedding for Object Matching," which is incorporated herein by reference in its entirety and for all purposes. Additional examples of selecting bounding boxes can be found in U.S. patent application Ser. No. 16/201,842, filed on Nov. 27, 2018, entitled "Bounding Box Selection," which is incorporated herein by reference in its entirety and for all purposes As mentioned above, in various examples, the active prediction component 104 can receive map data that represents fixed features of the environment such as one or more of: a roadway, an intersection, a crosswalk, a traffic signal, a centerline, a roadway boundary, a speed bump, a school zone, and so on. The map data can be received from one or more components of a vehicle computing device or remote computing device (e.g., a computing device associated with an autonomous vehicle in a fleet of vehicles or other computing device remote from the vehicle 102.)

In some examples, the vehicle computing device may be configured to detect an object in the environment 100, such as object 110 and object 112 (e.g., a vehicle), and object 114 (e.g., a pedestrian), just to name a few. In some examples, the vehicle computing device may be configured to receive, detect, infer, estimate, or otherwise determine one or more trajectories (e.g., direction, speed, acceleration, etc.), for each detected object. As shown in FIG. 1, the object 110 is associated with object trajectories 116(1) and 116(2), the object 112 is associated with object trajectories 118(1) and 118(2), the object 114 is associated with an object trajectory 120, and the vehicle 102 is associated with the vehicle trajectories 122(1) and 122(2) determined by the vehicle computing device (e.g., using the perception component 422, the prediction component 424, or another model). In some examples, the active prediction component 104 may receive path information associated with the aforementioned object trajectories (e.g., 116(1), 116(2), 118(1), 118(2), 120, 122(1), and 122(2)) from a machine learned model. Though FIG. 1 shows one or two trajectories associated with the various objects, any number of objects may be detected and any number of object trajectories may be predicted for each object. Additional details of using to-down representations are described in U.S. patent application Ser. No. 16/151,607, filed on Oct. 4, 2018, entitled "Trajectory Prediction on Top-Down Scenes," which is incorporated herein by reference in its entirety and for all purposes.

In some examples, the active prediction component 104 may determine potential intersection points for one or more paths (e.g., the object trajectories 118(1) and 118(2) or other object trajectory) associated with the vehicle 112. In such examples, the intersection point(s) output by the active prediction component 104 may indicate a potential intersection between the vehicle 112 and the vehicle 102 at an intersection point. Further description of determining potential intersections is described in connection with FIG. 2 and throughout the disclosure. Trajectories can be updated based on potential intersections and costs for a vehicle can be determined. For instance, object trajector(ies) most likely to interact with the vehicle 102 can be selected for further processing, such as for performing a simulation. Further description of the active prediction component 104 selecting trajectories and/or determining costs are described in FIG. 3, and elsewhere.

In some examples, the active prediction component 104 may determine a vehicle state and/or an object state at different times in the future. The active prediction component 104 may determine an action for the vehicle 110, the vehicle 112, the pedestrian 114, and/or the vehicle 102 during simulation. For example, actions (e.g., a steering action, a braking action, an acceleration action, and so on) can be determined for a time period during a simulation (e.g., each second during a four second simulation). In various examples, the active prediction component 104 may select, determine, or otherwise predict a vehicle trajectory that the vehicle 102 may use to navigate in the environment 100 relative to one or more paths (e.g., the object trajectories 118(1) and 118(2) associated with the vehicle 112). In various examples, the output data 108 can indicate a likelihood that the vehicle 112 intersects with at least a portion of the vehicle 102. Additional discussion of future vehicle states and future object states can be found in FIG. 3 and elsewhere.

In some examples, the vehicle computing device may control the vehicle 102 in the environment based at least in part on the output data 108 (e.g., determine a candidate trajectory to avoid the objects in the environment). For instance, the active prediction component 104 may provide functionality to identify objects most likely to cause an intersection and communicate intersection information about the identified objects to other components of the vehicle computing device. Accordingly, potential intersections (e.g., a probability or likelihood of an intersection between object(s) and the vehicle) may be taken into account in operations (e.g., simulations, estimated states, interaction modeling, collision estimation, etc.) or other vehicle control planning operation (e.g., as determined by a planning component) to quickly and/or preemptively avoid objects, thereby improving safety of the vehicle. Additional detail for determining and utilizing the output data 108 are discussed throughout this disclosure. Additional details of performing simulations and/or generating trajectories are described in U.S. patent application Ser. No. 15/632,147, filed on Jun. 23, 2017, entitled "Trajectory Generation Using Temporal Logic and Tree Search," and U.S. patent application Ser. No. 15/843,512, filed on Dec. 15, 2017, entitled "Trajectory Generation Using Curvature Segments," which are incorporated herein by reference in their entirety and for all purposes.

In various examples, the active prediction component 104 may also or instead determine the output data 108 based at least in part on an occupancy grid comprising a plurality of grid points representing pixels (e.g., discretized portions) in the environment. As a non-limiting example, the active prediction component 104 may output one or more occupancy grids corresponding to one or more times in the future. If a grid portion overlaps with a known or expected position of the vehicle at that future time, a predicted intersection may be determined. In various examples, the active prediction model 104 can process the velocities, positions, trajectories, or other information associated with the object and the vehicle to determine a response to a simulation by the vehicle computing device (and/or a vehicle safety system). In various examples, the occupancy grid(s) and potential intersection point(s) determined by the active prediction model 104 may be from different heads of a same neural network.

The output data 108 from the active prediction component 104 can be used by a vehicle computing device in a variety of ways. For instance, the active prediction component 104 can determine to generate a signal indicating information about the output data 108 (e.g., the costs indicative of a potential intersection) with a planning component (e.g., planning component 426) of the vehicle computing device to control the vehicle 102 in the environment 100 (e.g., determine a vehicle trajectory and/or control a propulsion system, a braking system, or a steering system). The output data 108 may also or instead be used to perform a simulation by setting up conditions (e.g., an intersection, a number of objects, a likelihood for the object to exhibit abnormal behavior, etc.) for use during the simulation (e.g., by a vehicle computing device or computing device remote from the vehicle) in order to predict motion associated with object(s) in the environment.

A training component of a remote computing device, such as the training component 450 of the computing device(s) 436 and/or the vehicle computing device 404 may be implemented to train the active prediction component 104. Training data may include a wide variety of data, such as image data, video data, lidar data, radar data, audio data, other sensor data, etc., that is associated with a known or desired value (e.g., a desired classification, inference, prediction, etc.). Such values may generally be referred to as a "ground truth." To illustrate, the training data may be used for image classification and, as such, may include an image of an environment that is captured by an autonomous vehicle and that is associated with one or more classifications. In some examples, such a classification may be based on user input (e.g., user input indicating that the image depicts a specific type of object) or may be based on the output of another machine learned model. In some examples, such labeled classifications (or more generally, the labeled output associated with training data) may be referred to as ground truth.

Figure 2:
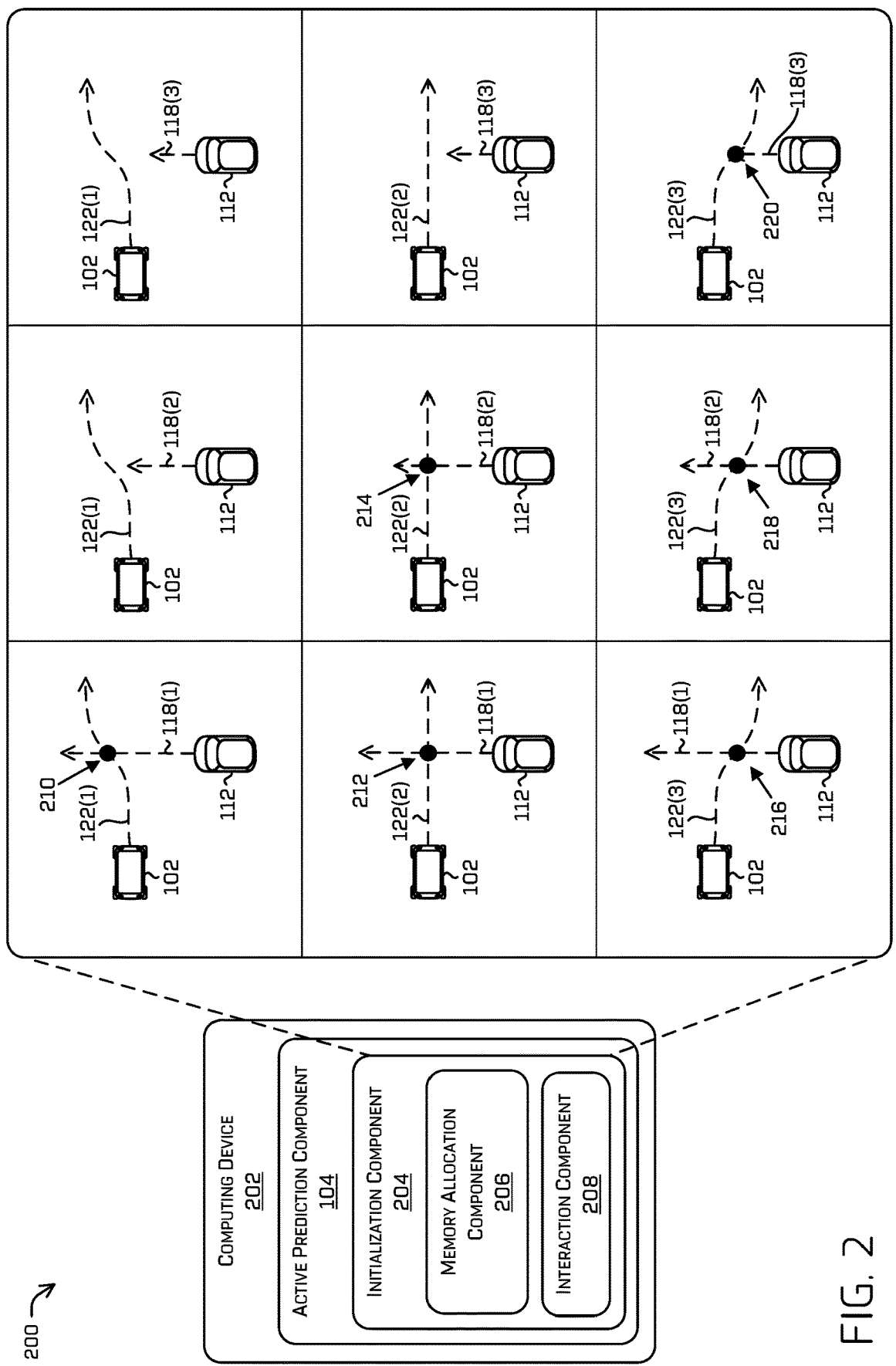
FIG. 2 is an illustration of another example environment in which one or more models determine potential interactions between one or more objects and a vehicle at a future time.

FIG. 2 is an illustration of another example environment 200, in which one or more models determine potential interactions between one or more objects and a vehicle at a future time. For instance, a computing device 202 can implement the active prediction component 104 to determine the output data 108 representing potential interactions (e.g., intersections or near-intersections (e.g., within a threshold distance)) between one or more objects (e.g., the object 110, the object 112, and/or the object 114) and the vehicle 102. In some examples, the computing device 202 may be associated with the vehicle computing device(s) 404 and/or the computing device(s) 436.

As shown in FIG. 2, the active prediction component 104 comprises an initialization component 204 which further comprises a memory allocation component 206 and an interaction component 208. In various examples, the initialization component 204 performs functionality to receive the input data 106 and perform "pre-processing" of the input data 106. For instance, the initialization component 204 can receive state data indicative of an environment, objects, and a vehicle (e.g., the vehicle 102), sensor data, and so on, and implement the memory allocation component 206 to allocate the input data 106 in one or more memories associated with the computing device 202. In various examples, allocating or assigning data in memory comprises the memory allocation component 206 determining a location or portion of the memory for efficient storing and accessing of the input data 106. In this way, a processor (e.g., one or more GPUs) of the computing device 202 can efficiently process the input data 106 during generation of the output data 108. In some examples, the memory allocation component 206 receives the input data 106 from one or more CPUs and allocates the input data 106 to one or more GPUs.

The interaction component 208 receives the input data 106 from the one or more memories after allocation by the memory allocation component 206 and provides functionality to determine potential interactions(s) between two objects and/or an object and the vehicle in the environment at a future time. For example, the interaction component 208 can process the trajectories 122(1), 122(2), and 122(3) associated with the vehicle 102 and the trajectories 118(1), 118(2), and 118(3) associated with the object 112. In some examples additional object trajectories up to 118(N) (where N is an integer greater than 1) can also be included. In some examples, the trajectory 122(1), 122(2), and 122(3) can be associated with an action to change lanes or turn to the left (relative to the vehicle 102), travel straight, and change lanes or turn to the right, respectively. In some examples, the trajectory 118(1) can be associated with a first velocity, the trajectory 118(2) can be associated with a second velocity less than the first velocity, and the trajectory 118(3) can be associated with a third velocity less than the second velocity. Although three actions for the vehicle 102 are illustrated and three trajectories for the object 112 are illustrated, any number of type of actions and/or trajectories can be determined or received by the active prediction component 104. Further, although FIG. 2 illustrates interactions between the vehicle 102 and the object 112, the techniques can include determining interactions between two object.

Additionally or alternatively, in various examples, the interaction component 208 can determine interactions between the vehicle 110, the vehicle 112, and the pedestrian 114, just to name a few. In various examples, a plurality of combinations of potential intersections can be determined between a first set of trajectories and a second set of trajectories associated with object(s) and/or the vehicle.

FIG. 2 depicts the trajectory 118(1) associated with the vehicle 112 intersecting with the vehicle trajectory 122(1) at an intersection point 210 and the trajectory 118(1) intersecting with the vehicle trajectory 122(2) at an intersection point 212 and an intersection point 214. Also shown in FIG. 2, the trajectory 118(1) associated with the vehicle 112 intersects with the vehicle trajectory 122(3) at an intersection point 216, an intersection point 218, and an intersection point 220. FIG. 2 further depicts areas in the environment 200 that the trajectory 118(1) does not intersect with the vehicle trajectory 122(1), the vehicle trajectory 122(2), or the vehicle trajectory 122(3). In some examples, the potential intersection points can be determined for the object trajectory 118(1), and/or for other objects and the associated trajector(ies) therewith.

Generally, in various examples, the active prediction component 104 can determine, based at least in part on an output by the interaction component 208, the intersection points at which the objects (e.g., the object 110, the object 112, and/or the object 114) may interact with the vehicle 102. In such examples, the active prediction component 104 can further process the object trajectories associated with the potential intersection point(s) (e.g., the intersection points 210, 212, 214, 216, 218, and 220) as described in relation to FIG. 3. In other examples, the object trajectories associated with intersection points most likely to interact with the vehicle 102 first can be selected by the active prediction component 104 for further processing. In some examples, the active prediction component 104 can make an initial determination that an interaction is likely not possible, thereby saving computational resources from processing additional detail (e.g., performing a simulation, determining an estimated state of an object or the vehicle, and so on) associated with the aforementioned intersections.

In various examples, one or more of: the vehicle trajectories 122(1), 122(2), 122(3) and/or the object trajectories (e.g., the trajectories 116(1), 116(2), 118(1), 118(2) . . . 118(N), and 120) may represent a "corridor" as opposed to a line shown in FIG. 2. For example, any of the trajectories as described herein may represent an area of the environment 200 that may be occupied by the vehicle and/or the object as the vehicle traverses the environment.

Figure 3:
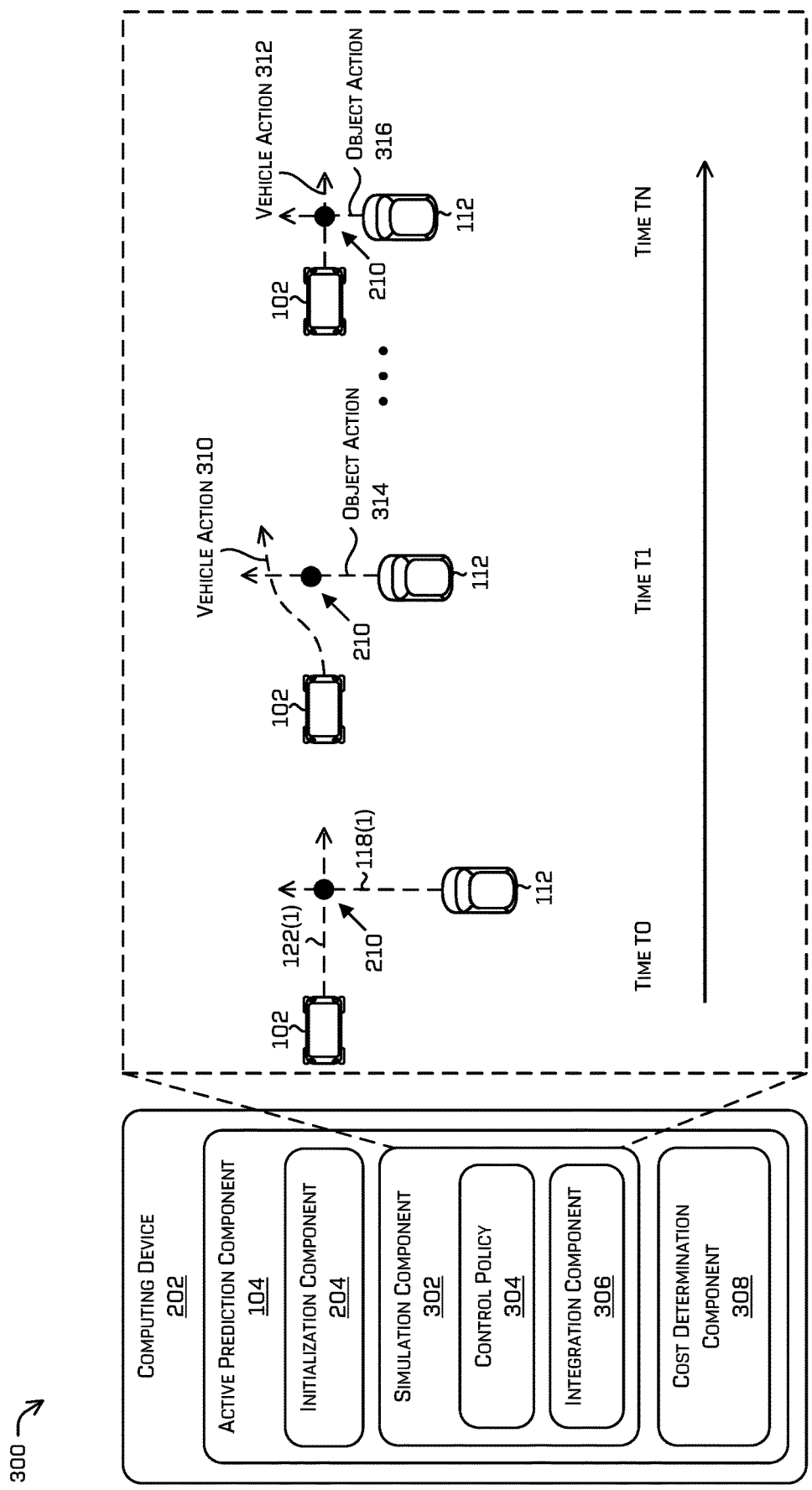
FIG. 3 is an illustration of another example environment in which one or more models determine potential vehicle states and/or object states at a future time.

In some examples, the active prediction component 104 can associate one or more of the intersection points 210, 212, 214, 216, 218, and 220 with an intersection probability, and output the intersection points associated with the object most likely to reach the intersection point first for further processing, such as by a simulation component as described in FIG. 3. In some examples, two objects (e.g., the vehicle 110 and the vehicle 112) may intersect with a same vehicle trajectory, and the active prediction component 104 can identify or determine which of the two objects (or object trajectories associated therewith) to process with the simulation component based at least in part on a control policy associated with rules of the road, right of way logic, physics, kinematics, dynamics, and the like. In this way, computational resources can be omitted with respect to, for example, processing data associated with scenarios in which the object reaches an intersection point with the vehicle 102 after another object. That is, the initialization component 204 can select one or more of the object trajectories (e.g., the trajectories 116(1), 116(2), 118(1), 118(2), and 120) for further processing based at least in part on which of the trajectories reach a respective intersection point with the vehicle 102 first. In various examples, the initialization component 204 can select a trajectory from among multiple trajectories based at least in part on a tree search comprising logic to identify which of the objects takes priority for potentially interacting with the vehicle.

In some examples, a tree search can determine potential interactions between object trajectories of different objects and/or object trajectories and vehicle trajectories, and the potential interactions determined by the tree search can be used in a simulation, as further described in FIG. 3 and elsewhere. In various examples, the tree search can identify potential interactions over time to reduce an amount of potential interactions for a later time (e.g., at each second or other time interval the tree search can determine a most likely interaction between object(s) and the vehicle). In some examples, vehicle actions can be explored as various branches of a tree search and tree branches can be pruned or ignored if a cost associated with an action meets or exceeds a threshold cost. As a non-limiting example, one or more actions may be contemplated at discrete steps in the future (e.g., at fixed time, distance intervals, or some other event-based step). In such an example, the tree may branch at such discrete points based on differing actions that the vehicle could take at those points and the methods described herein may be used in selecting between those branches when expanding the tree. For instance, branches may be explored having the lowest cost and/or in which there is no adverse event (e.g., collision, uncomfortable control, etc.).

FIG. 3 is an illustration of another example environment 300, in which one or more models determine potential vehicle states and/or object states at a future time. For instance, the computing device 202 can implement the active prediction component 104 to determine the output data 108 representing potential future states for one or more objects (e.g., the object 110, the object 112, and/or the object 114) and/or the vehicle 102. In some examples, the computing device 202 may be associated with the vehicle computing device(s) 404 and/or the computing device(s) 436.

FIG. 3 depicts the active prediction component 104 comprising a simulation component 302 which further comprises a control policy 304 and an integration component 306. FIG. 3 further depicts the active prediction component 104 comprising a cost determination component 308.

In some examples, the simulation component 302 can provide functionality to simulate a vehicle action 310 and a vehicle action 312 at different times in the future. Each of the vehicle action 310 and the vehicle action 312 can represent a change in vehicle state (e.g., a change in velocity, acceleration, turn rate, yaw, and so on) from a first time to a second time. In some examples, an example vehicle action can include not changing the vehicle state (e.g., remaining in place such as staying in a lane, keeping a same steering action, braking action, and/or acceleration action). In some examples, the simulation component 302 can initiate an example scenario that represents the change in the vehicle state over time. In such examples, the scenario can include predictions about future positions and/or velocities of object(s) in an environment proximate to the vehicle such associated with in relation to the intersection point 210.

In some examples, the simulation component 302 can simulate possible actions for the vehicle and/or objects over time. For instance, if a vehicle takes a first action at a first time, such as 1 second into the simulation, the simulation component 302 can determine a second action for the vehicle based on the first action taken by the vehicle. In this way, the simulation component 302 can provide functionality to "actively" consider possible actions at each instance of the simulation (e.g., over 4 seconds) similar to how a driver makes decisions when operating a vehicle. In some examples, the simulation component 302 can determine actions for both the vehicle 102 and the object 112 that are dependent upon previous actions as time increases during the simulation.

The control policy 304 can comprise one or more of: a physics policy, a dynamics policy, a kinematics policy, and/or a rules policy indicating how the vehicle and objects can potentially interact or indicating information about rules of the road such as a right of way associated with a roadway, an intersection, or a navigable surface. In some examples, the active prediction component 104 can implement a machine learned model that accesses the control policy 304 to determine actions, trajectories, positions, or other data associated with the vehicle and/or object(s). For instance, the control policy 304 can be used by a machine learned model during a simulation performed by the simulation component 302.

As the vehicle 102 navigates in the environment 300, the vehicle 112 may become closer to the vehicle 102 such that the active prediction component 104 determines different potential actions (e.g., a braking action, an acceleration action, and the like) for the vehicle 102 to avoid a collision with the vehicle 112. Though FIG. 3 depicts the simulation component 302 representing the vehicle actions 310 and 312 relative to the vehicle 112, additional objects (whether or not associated with an intersection point) may also or instead be processed by the simulation component 302.

As illustrated in FIG. 3, the output of the simulation component 302 can include predicting scenarios at times T0, T1, . . . TN (where N is an integer greater than 1) indicative of future states of the environment. For example, sensor data associated with the vehicle 102 can be used to perform the scenarios to identify potential objects that may intersect with the vehicle 102 at different times in the future. In one specific example, the scenarios may be performed for four seconds in the future at one second intervals to identify object(s) in an area around the vehicle 102 including the vehicle 112. As shown in FIG. 3, as time changes from time T0 to time T1, the vehicle 112 and the vehicle 102 are approaching one another. At time T1, the simulation component 302 can determine the vehicle action 310 based at least in part on predicting an object action 314 (e.g., a change in speed, acceleration, braking, etc.) associated with the vehicle 112. For instance, the vehicle action 310 can include steering, accelerating, and/or braking to avoid the vehicle 112 relative to the object action 314. At time T2, the simulation component 302 can determine the vehicle action 312 based at least in part on predicting an object action 316 associated with the vehicle 112.

In various examples, the vehicle action 310 and the vehicle action 312 can be determined based at least in part on accessing and/or storing data in memory (e.g., by the memory allocation component 206) for processing by one or more GPUs. As time changes in the simulation, object states from a first time (e.g., time T1) can be accessed for consideration during another time (e.g., time T2) to minimize an amount of sensor data stored in memory which enables parallel execution in an efficient manner (versus not implementing the memory allocation component 206, for example). In some examples, the memory allocation component 206 can dynamically adjust a size of the storage memory between time intervals during a scenario (e.g., between each second of a four second simulation), to reduce a number of registers per thread, and/or to reduce a number of times memory is accessed by a component of the active prediction component 104.

In various examples, the vehicle action 310, the vehicle action 312, the object action 314, and/or the object action 316 can be determined based at least in part on the control policy 304 and the integration component 306. For instance, the integration component 306 can predict a response by the vehicle 102 to the scenario at time T0, the scenario at time T1, and/or the scenario at time TN based at least in part on data associated with the control policy 304 (e.g., information indicating rules of the road such as a right of way associated with a roadway, an intersection, or a navigable surface). In such examples, the integration component 306 can generate a signal indicative of the responses, and send the signal to another model or component of a vehicle computing device for validating commands such as determinations by the planning component 426 (e.g., determining a candidate trajectory for the vehicle 102).

In some examples, actions by the vehicle and/or an object can change from during the simulation from a first time to a second time.

In various examples, the cost determination component 308 can determine a cost associated with a vehicle action(s)

and/or an object action(s) determined by the simulation component 302. For example, the cost determination component 308 can determine a reference cost, an obstacle cost, a steering cost, and/or an acceleration cost, and so on associated with the vehicle actions 310 and 312 and/or the object actions 314 and 316.

In some examples, the cost determination component 308 may determine a cost associated with each of the aforementioned actions (also referred to associated with reference actions). For example, the cost determination component 308 can determine a first obstacle cost and a second obstacle cost representing a distance relative to the vehicle 102, and identify the object having a higher cost associated with being more likely to intersect with the vehicle 102. In addition or in the alternative, the cost determination component 308 can determine a reference cost of the vehicle 102 relative to a roadway centerline usable to identify an amount of deviation from the centerline that may avoid the object(s). In various examples, the costs associated with or otherwise determined by the cost determination component 308 can be used to select a candidate trajectory for the vehicle 102 (e.g., the planning component can receive a signal indicated the lowest aggregated costs representing a safest potential action). Additional examples of a vehicle architecture determining costs can be found, for example, in U.S. patent application Ser. No. 16/147,492 titled "Trajectory Generation and Optimization Using Closed-Form Numerical Integration in Route-Relative Coordinates" filed Sep. 28, 2018, the entirety of which is herein incorporated by reference in its entirety and for all purposes. Additional examples of a planning a route in an environment can be found, for example, in U.S. patent application Ser. No. 16/179,679 titled "Adaptive Scaling in Trajectory Generation" filed Nov. 2, 2018, the entirety of which is herein incorporated by reference in its entirety and for all purposes.

While described as a separate system, in some examples, techniques to evaluate trajectories described herein in relation to FIGS. 1-3 may be implemented by other vehicle systems, components, and/or computing devices. For example, and as will be described in further detail with regard to FIG. 4, the prediction techniques described herein in relation to FIGS. 1-3 may be implemented at least partially by or in association with a perception component, a planning component, and/or a model component of FIG. 4.

Figure 4:
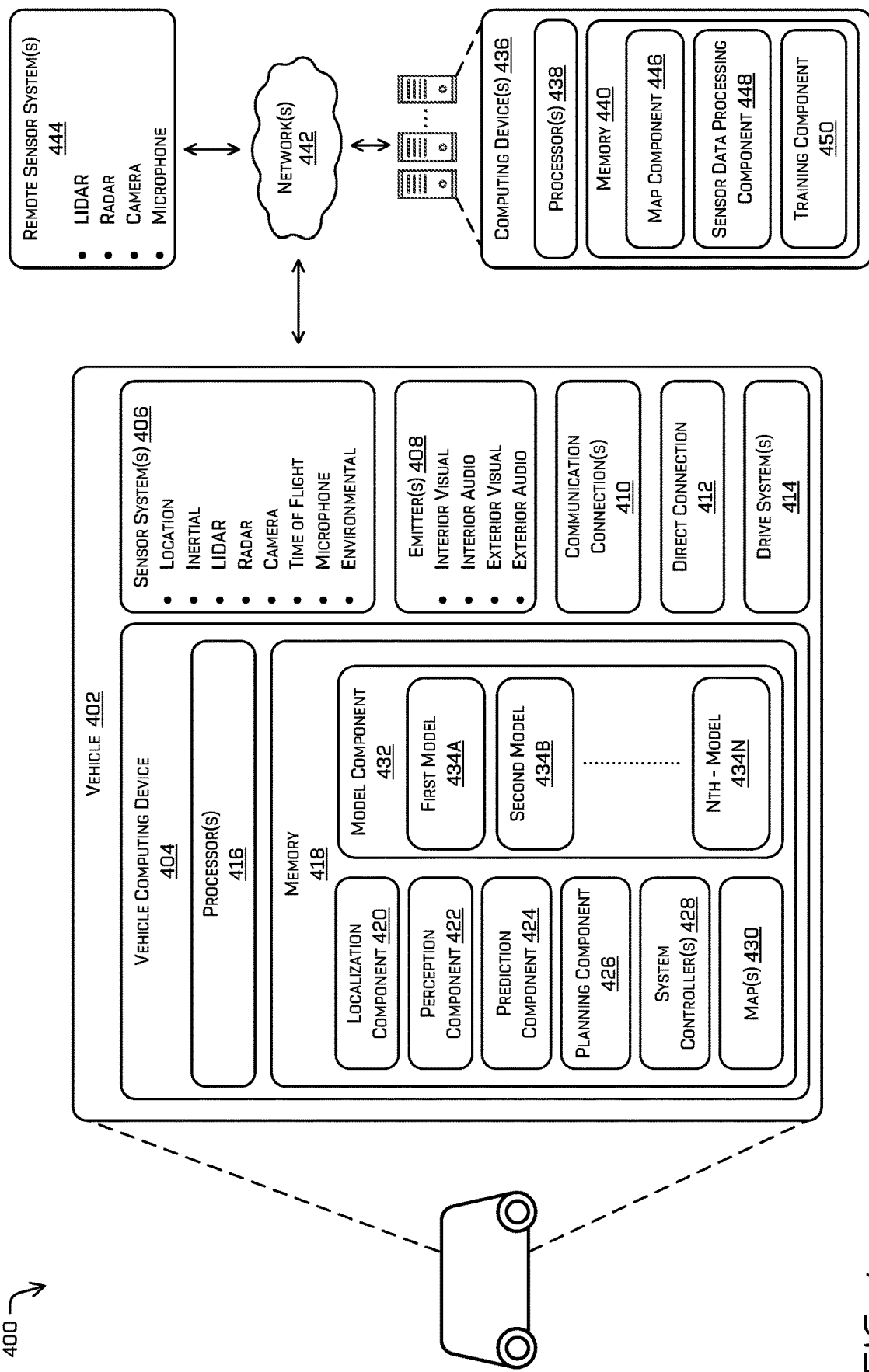
FIG. 4 is a block diagram of an example system for implementing the techniques described herein.

FIG. 4 is a block diagram of an example system 400 for implementing the techniques described herein. In at least one example, the system 400 may include a vehicle, such as vehicle 402.

The vehicle 402 may include a vehicle computing device 404, one or more sensor systems 406, one or more emitters 408, one or more communication connections 410, at least one direct connection 412, and one or more drive system(s) 414.

The vehicle computing device 404 may include one or more processors 416 and memory 418 communicatively coupled with the one or more processors 416. In the illustrated example, the vehicle 402 is an autonomous vehicle; however, the vehicle 402 could be any other type of vehicle, such as a semi-autonomous vehicle, or any other system having at least an image capture device (e.g., a camera enabled smartphone). In some instances, the autonomous vehicle 402 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 402 may be a fully or partially autonomous vehicle having any other level or classification.

In various examples, the vehicle computing device 404 may store sensor data associated with actual location of an object at the end of the set of estimated states (e.g., end of the period of time) and may use this data as training data to train one or more models. In some examples, the vehicle computing device 404 may provide the data to a remote computing device (i.e., computing device separate from vehicle computing device such as the computing device(s) 436) for data analysis. In such examples, the remote computing device(s) may analyze the sensor data to determine an actual location, velocity, direction of travel, or the like of the object at the end of the set of estimated states. Additional details of training a machine learned model based on stored sensor data by minimizing differences between actual and predicted positions and/or predicted trajectories is described in U.S. patent application Ser. No. 16/282,201, filed on Mar. 12, 2019, entitled "Motion Prediction Based on Appearance," which is incorporated herein by reference.

In the illustrated example, the memory 418 of the vehicle computing device 404 stores a localization component 420, a perception component 422, a prediction component 424, a planning component 426, one or more system controllers 428, one or more maps 430, and a model component 432 including one or more model(s), such as a first model 434A, a second model 434B, up to an Nth model 434N (collectively "models 434"), where N is an integer. Though depicted in FIG. 4 as residing in the memory 418 for illustrative purposes, it is contemplated that the localization component 420, the perception component 422, the prediction component 424, the planning component 426, one or more system controllers 428, one or more maps 430, and/or the model component 432 including the model(s) 434 may additionally, or alternatively, be accessible to the vehicle 402 (e.g., stored on, or otherwise accessible by, memory remote from the vehicle 402, such as, for example, on memory 440 of a remote computing device 436).

In at least one example, the localization component 420 may include functionality to receive data from the sensor system(s) 406 to determine a position and/or orientation of the vehicle 402 (e.g., one or more of an x-, y-, z-position, roll, pitch, or yaw). For example, the localization component 420 may include and/or request/receive a map of an environment, such as from map(s) 430 and/or map component 446, and may continuously determine a location and/or orientation of the autonomous vehicle within the map. In some instances, the localization component 420 may utilize SLAM (simultaneous localization and mapping), CLAMS (calibration, localization and mapping, simultaneously), relative SLAM, bundle adjustment, non-linear least squares optimization, or the like to receive image data, lidar data, radar data, IMU data, GPS data, wheel encoder data, and the like to accurately determine a location of the autonomous vehicle. In some instances, the localization component 420 may provide data to various components of the vehicle 402 to determine an initial position of an autonomous vehicle for determining the relevance of an object to the vehicle 402, as discussed herein.

In some instances, the perception component 422 may include functionality to perform object detection, segmentation, and/or classification. In some examples, the perception component 422 may provide processed sensor data that indicates a presence of an object (e.g., entity) that is proximate to the vehicle 402 and/or a classification of the object as an object type (e.g., car, pedestrian, cyclist, animal, building, tree, road surface, curb, sidewalk, unknown, etc.). In some examples, the perception component 422 may provide processed sensor data that indicates a presence of a stationary entity that is proximate to the vehicle 402 and/or a classification of the stationary entity as a type (e.g., a building, tree, road surface, curb, sidewalk, unknown, etc.). In additional or alternative examples, the perception component 422 may provide processed sensor data that indicates one or more features associated with a detected object (e.g., a tracked object) and/or the environment in which the object is positioned. In some examples, features associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Features associated with the environment may include, but are not limited to, a presence of another object in the environment, a state of another object in the environment, a time of day, a day of a week, a season, a weather condition, an indication of darkness/light, etc.

The prediction component 424 can generate one or more probability maps representing prediction probabilities of possible locations of one or more objects in an environment. For example, the prediction component 424 can generate one or more probability maps for vehicles, pedestrians, animals, and the like within a threshold distance from the vehicle 402. In some instances, the prediction component 424 can measure a track of an object and generate a discretized prediction probability map, a heat map, a probability distribution, a discretized probability distribution, and/or a trajectory for the object based on observed and predicted behavior. In some instances, the one or more probability maps can represent an intent of the one or more objects in the environment.

In some examples, the prediction component 424 may generate predicted trajectories of objects (e.g., objects) in an environment and/or to generate predicted candidate trajectories for the vehicle 402. For example, the prediction component 424 may generate one or more predicted trajectories for objects within a threshold distance from the vehicle 402. In some examples, the prediction component 424 may measure a trace of an object and generate a trajectory for the object based on observed and predicted behavior.

In general, the planning component 426 may determine a path for the vehicle 402 to follow to traverse through an environment. For example, the planning component 426 may determine various routes and trajectories and various levels of detail. For example, the planning component 426 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planning component 426 may generate an instruction for guiding the autonomous vehicle along at least a portion of the route from the first location to the second location. In at least one example, the planning component 426 may determine how to guide the autonomous vehicle from a first waypoint in the sequence of waypoints to a second waypoint in the sequence of waypoints. In some examples, the instruction may be a candidate trajectory, or a portion of a trajectory. In some examples, multiple trajectories may be substantially simultaneously generated (e.g., within technical tolerances) in accordance with a receding horizon technique. A single path of the multiple paths in a receding data horizon having the highest confidence level may be selected to operate the vehicle. In various examples, the planning component 426 can select a trajectory for the vehicle 402 based at least in part on receiving data representing an output of the model component 432.

In other examples, the planning component 426 can alternatively, or additionally, use data from the localization component 420, the perception component 422, and/or the prediction component 424 to determine a path for the vehicle 402 to follow to traverse through an environment. For example, the planning component 426 can receive data from the localization component 420, the perception component 422, and/or the prediction component 424 regarding objects associated with an environment. Using this data, the planning component 426 can determine a route to travel from a first location (e.g., a current location) to a second location (e.g., a target location) to avoid objects in an environment. In at least some examples, such a planning component 426 may determine there is no such collision free path and, in turn, provide a path which brings vehicle 402 to a safe stop avoiding all collisions and/or otherwise mitigating damage. Additionally or alternatively, the planning component 426 can determine the path for the vehicle 402 to follow based at least in part on data received from the simulation component 302 and/or the cost determination component 308 as described in FIG. 3 and elsewhere.

In at least one example, the vehicle computing device 404 may include one or more system controllers 428, which may be configured to control steering, propulsion, braking, safety, emitters, communication, and other systems of the vehicle 402. The system controller(s) 428 may communicate with and/or control corresponding systems of the drive system(s) 414 and/or other components of the vehicle 402.

The memory 418 may further include one or more maps 430 that may be used by the vehicle 402 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 402 may be controlled based at least in part on the map(s) 430. That is, the map(s) 430 may be used in connection with the localization component 420, the perception component 422, the prediction component 424, and/or the planning component 426 to determine a location of the vehicle 402, detect objects in an environment, generate routes, determine actions and/or trajectories to navigate within an environment.

In some examples, the one or more maps 430 may be stored on a remote computing device(s) (such as the computing device(s) 436) accessible via network(s) 442. In some examples, multiple maps 430 may be stored based on, for example, a characteristic (e.g., type of entity, time of day, day of week, season of the year, etc.). Storing multiple maps 430 may have similar memory requirements, but increase the speed at which data in a map may be accessed.

As illustrated in FIG. 4, the vehicle computing device 404 may include a model component 432. The model component 432 may be configured to perform the functionality of the active prediction component 104, including predicting a likelihood of object intersections, such as with the objects 110, 112, and 114 of FIG. 1. In various examples, the model component 432 may receive one or more features associated with the detected object(s) from the perception component 422 and/or from the sensor system(s) 406. In some examples, the model component 432 may receive environment characteristics (e.g., environmental factors, etc.) and/or weather characteristics (e.g., weather factors such as snow, rain, ice, etc.) from the perception component 422 and/or the sensor system(s) 406. While shown separately in FIG. 4, the model component 432 could be part of the prediction component 424, the planning component 426, or other component(s) of the vehicle 402.

In various examples, the model component 432 may send predictions from the one or more models 434 that may be used by the prediction component 424 and/or the planning component 426 to generate one or more predicted trajectories of the object (e.g., direction of travel, speed, etc.) and/or one or more predicted trajectories of the object (e.g., direction of travel, speed, etc.), such as from the prediction component thereof. In some examples, the planning component 426 may determine one or more actions (e.g., reference actions and/or sub-actions) for the vehicle 402, such as vehicle candidate trajectories. In some examples, the model component 432 may be configured to determine whether an object intersects at an intersection point based at least in part on the one or more actions for the vehicle 402. In some examples, the model component 432 may be configured to determine the actions that are applicable to the environment, such as based on environment characteristics, weather characteristics, or the like.

The model component 432 may generate sets of estimated states of the vehicle and one or more detected objects forward in the environment over a time period. The model component 432 may generate a set of estimated states for each action (e.g., reference action and/or sub-action) determined to be applicable to the environment. The sets of estimated states may include one or more estimated states, each estimated state including an estimated position of the vehicle and an estimated position of a detected object(s). In some examples, the estimated states may include estimated positions of the detected objects at an initial time (T=0) (e.g., current time).

The estimated positions may be determined based on a detected trajectory and/or predicted trajectories associated with the object. In some examples, the estimated positions may be determined based on an assumption of substantially constant velocity and/or substantially constant trajectory (e.g., little to no lateral movement of the object). In some examples, the estimated positions (and/or potential trajectories) may be based on passive and/or active prediction. In some examples, the model component 432 may utilize physics and/or geometry based techniques, machine learning, linear temporal logic, tree search methods, heat maps, and/or other techniques for determining predicted trajectories and/or estimated positions of objects.

In various examples, the estimated states may be generated periodically throughout the time period. For example, the model component 432 may generate estimated states at 0.1 second intervals throughout the time period. For another example, the model component 432 may generate estimated states at 0.05 second intervals. The estimated states may be used by the planning component 426 in determining an action (e.g., the vehicle action 310 and the vehicle action 314) for the vehicle 402 to take in an environment.

In various examples, the model component 432 may utilize machine learned techniques to predict risks associated with evaluated trajectories. In such examples, the machine learned algorithms may be trained to determine, based on sensor data and/or previous predictions by the model, that an object is likely to behave in a particular way relative to the vehicle 402 at a particular time during a set of estimated states (e.g., time period). In such examples, one or more of the vehicle 402 state (position, velocity, acceleration, trajectory, etc.) and/or the object state, classification, etc. may be input into such a machine learned model and, in turn, a behavior prediction may be output by the model.

In various examples, characteristics associated with each object type may be used by the model component 432 to determine an object velocity or acceleration usable to predict potential intersection(s) between objects and/or between the vehicle 402 and one or more objects. Examples of characteristics of an object type may include, but not be limited to: a maximum longitudinal acceleration, a maximum lateral acceleration, a maximum vertical acceleration, a maximum speed, maximum change in direction for a given speed, and the like.

As can be understood, the components discussed herein (e.g., the localization component 420, the perception component 422, the prediction component 424, the planning component 426, the one or more system controllers 428, the one or more maps 430, the model component 432 including the model(s) 434 are described as divided for illustrative purposes. However, the operations performed by the various components may be combined or performed in any other component.

While examples are given in which the techniques described herein are implemented by a planning component and/or a model component of the vehicle, in some examples, some or all of the techniques described herein could be implemented by another system of the vehicle, such as a secondary safety system. Generally, such an architecture can include a first computing device to control the vehicle 402 and a secondary safety system that operates on the vehicle 402 to validate operation of the primary system and to control the vehicle 402 to avoid collisions.

In some instances, aspects of some or all of the components discussed herein may include any models, techniques, and/or machine learned techniques. For example, in some instances, the components in the memory 418 (and the memory 440, discussed below) may be implemented as a neural network.

As described herein, an exemplary neural network is a technique which passes input data through a series of connected layers to produce an output. Each layer in a neural network may also comprise another neural network, or may comprise any number of layers (whether convolutional or not). As can be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 406 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 406 may include multiple instances of each of these or other types of sensors. For instance, the lidar sensors may include individual lidar sensors located at the corners, front, back, sides, and/or top of the vehicle 402. As another example, the camera sensors may include multiple cameras disposed at various locations about the exterior and/or interior of the vehicle 402. The sensor system(s) 406 may provide input to the vehicle computing device 404. Additionally, or in the alternative, the sensor system(s) 406 may send sensor data, via the one or more networks 442, to the one or more computing device(s) 436 at a particular frequency, after a lapse of a predetermined period of time, in near real-time, etc.

The vehicle 402 may also include one or more emitters 408 for emitting light and/or sound. The emitter(s) 408 may include interior audio and visual emitters to communicate with passengers of the vehicle 402. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 408 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 402 may also include one or more communication connections 410 that enable communication between the vehicle 402 and one or more other local or remote computing device(s). For instance, the communication connection(s) 410 may facilitate communication with other local computing device(s) on the vehicle 402 and/or the drive system(s) 414. Also, the communication connection(s) 410 may allow the vehicle to communicate with other nearby computing device(s) (e.g., remote computing device 436, other nearby vehicles, etc.) and/or one or more remote sensor system(s) 444 for receiving sensor data. The communications connection(s) 410 also enable the vehicle 402 to communicate with a remote teleoperations computing device or other remote services.

The communications connection(s) 410 may include physical and/or logical interfaces for connecting the vehicle computing device 404 to another computing device or a network, such as network(s) 442. For example, the communications connection(s) 410 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 402 may include one or more drive systems 414. In some examples, the vehicle 402 may have a single drive system 414. In at least one example, if the vehicle 402 has multiple drive systems 414, individual drive systems 414 may be positioned on opposite ends of the vehicle 402 (e.g., the front and the rear, etc.). In at least one example, the drive system(s) 414 may include one or more sensor systems to detect conditions of the drive system(s) 414 and/or the surroundings of the vehicle 402. By way of example and not limitation, the sensor system(s) may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, lidar sensors, radar sensors, etc. Some sensors, such as the wheel encoders may be unique to the drive system(s) 414. In some cases, the sensor system(s) on the drive system(s) 414 may overlap or supplement corresponding systems of the vehicle 402 (e.g., sensor system(s) 406).

The drive system(s) 414 may include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 414 may include a drive module controller which may receive and preprocess data from the sensor system(s) and to control operation of the various vehicle systems. In some examples, the drive module controller may include one or more processors and memory communicatively coupled with the one or more processors. The memory may store one or more modules to perform various functionalities of the drive system(s) 414. Furthermore, the drive system(s) 414 may also include one or more communication connection(s) that enable communication by the respective drive module with one or more other local or remote computing device(s).

In at least one example, the direct connection 412 may provide a physical interface to couple the one or more drive system(s) 414 with the body of the vehicle 402. For example, the direct connection 412 may allow the transfer of energy, fluids, air, data, etc. between the drive system(s) 414 and the vehicle. In some instances, the direct connection 412 may further releasably secure the drive system(s) 414 to the body of the vehicle 402.

In at least one example, the localization component 420, the perception component 422, the prediction component 424, the planning component 426, the one or more system controllers 428, the one or more maps 430, and the model component 432, may process sensor data, as described above, and may send their respective outputs, over the one or more network(s) 442, to the computing device(s) 436. In at least one example, the localization component 420, the perception component 422, the prediction component 424, the planning component 426, the one or more system controllers 428, the one or more maps 430, and the model component 432 may send their respective outputs to the remote computing device(s) 436 at a particular frequency, after a lapse of a predetermined period of time, in near real-time, etc.

In some examples, the vehicle 402 may send sensor data to the computing device(s) 436 via the network(s) 442. In some examples, the vehicle 402 may receive sensor data from the computing device(s) 436 and/or remote sensor system(s) 444 via the network(s) 442. The sensor data may include raw sensor data and/or processed sensor data and/or representations of sensor data. In some examples, the sensor data (raw or processed) may be sent and/or received as one or more log files.

The computing device(s) 436 may include processor(s) 438 and a memory 440 storing the map component 446, a sensor data processing component 448, and a training component 450. In some examples, the map component 446 may include functionality to generate maps of various resolutions. In such examples, the map component 446 may send one or more maps to the vehicle computing device 404 for navigational purposes. In various examples, the sensor data processing component 448 may be configured to receive data from one or more remote sensors, such as sensor system(s) 406 and/or remote sensor system(s) 444. In some examples, the sensor data processing component 448 may be configured to process the data and send processed sensor data to the vehicle computing device 404, such as for use by the model component 432 (e.g., the model(s) 434). In some examples, the sensor data processing component 448 may be configured to send raw sensor data to the vehicle computing device 404.

In some instances, the training component 450 can include functionality to train a machine learning model to output evaluate trajectories. For example, the training component 450 can receive sensor data that represents an object traversing through an environment for a period of time, such as 0.1 milliseconds, 1 second, 3, seconds, 5 seconds, 7 seconds, and the like. At least a portion of the sensor data can be used as an input to train the machine learning model.

In some instances, the training component 450 may be executed by the processor(s) 438 to train the a machine learning model based on training data. The training data may include a wide variety of data, such as sensor data, audio data, image data, map data, inertia data, vehicle state data, historical data (log data), or a combination thereof, that is associated with a value (e.g., a desired classification, inference, prediction, etc.). Such values may generally be referred to as a "ground truth." To illustrate, the training data may be used for determining risk associated with evaluated trajectories and, as such, may include data representing an environment that is captured by an autonomous vehicle and that is associated with one or more classifications or determinations. In some examples, such a classification may be based on user input (e.g., user input indicating that the data depicts a specific risk) or may be based on the output of another machine learned model. In some examples, such labeled classifications (or more generally, the labeled output associated with training data) may be referred to as ground truth.

In some instances, the training component 450 can include functionality to train a machine learning model to output classification values. For example, the training component 450 can receive data that represents labelled collision data (e.g. publicly available data, sensor data, and/or a combination thereof). At least a portion of the data can be used as an input to train the machine learning model. Thus, by providing data where the vehicle traverses an environment, the training component 450 can be trained to output potential intersection(s) associated with objects, as discussed herein.

In some examples, the training component 450 can include training data that has been generated by a simulator. For example, simulated training data can represent examples where a vehicle collides with an object in an environment or nearly collides with an object in an environment, to provide additional training examples.

The processor(s) 416 of the vehicle 402 and the processor(s) 438 of the computing device(s) 436 may be any suitable processor capable of executing instructions to process data and perform operations as described herein. By way of example and not limitation, the processor(s) 416 and 438 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 418 and memory 440 are examples of non-transitory computer-readable media. The memory 418 and memory 440 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

It should be noted that while FIG. 4 is illustrated as a distributed system, in alternative examples, components of the vehicle 402 may be associated with the computing device(s) 436 and/or components of the computing device(s) 436 may be associated with the vehicle 402. That is, the vehicle 402 may perform one or more of the functions associated with the computing device(s) 436, and vice versa.

Figure 5A:
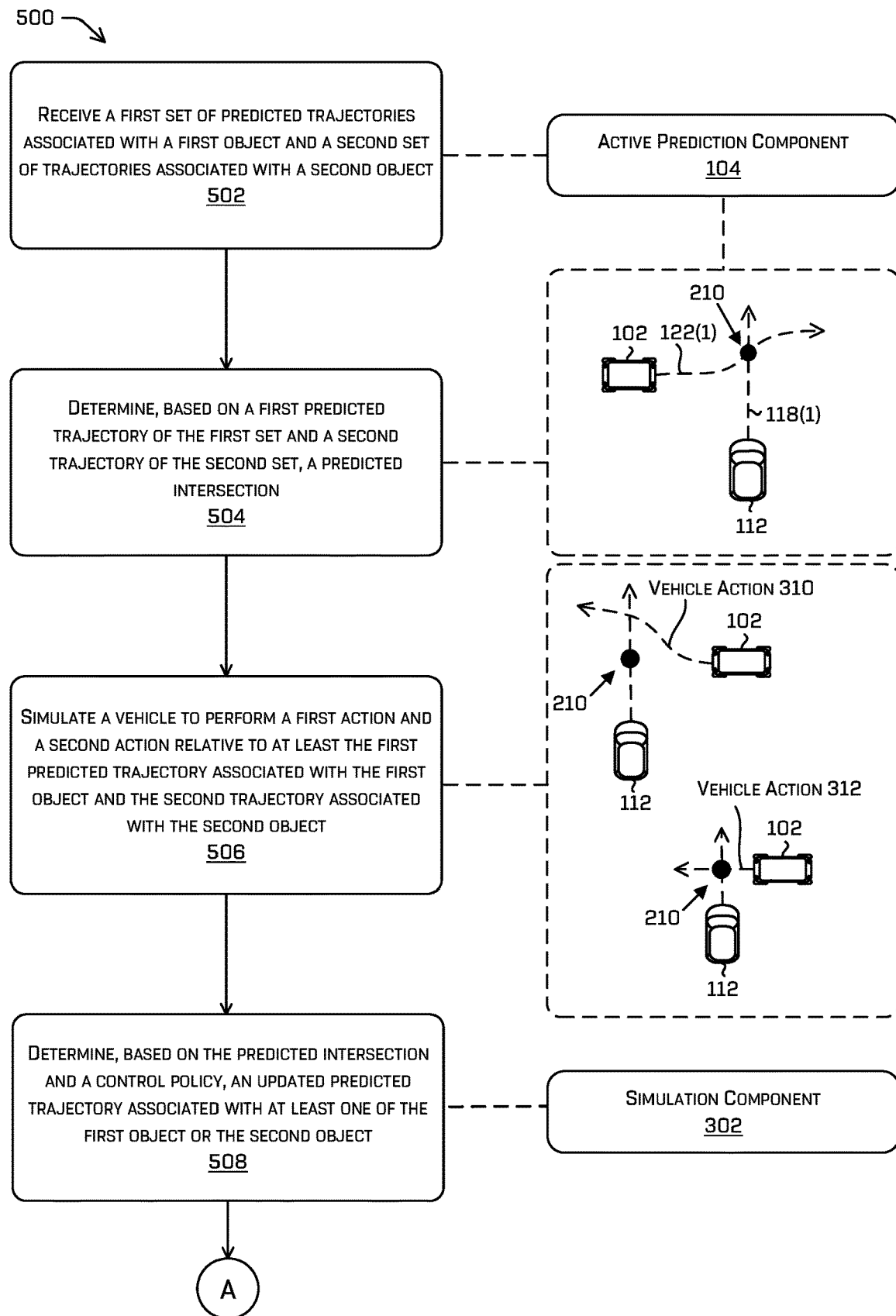
FIG. 5A is a first part of a flowchart depicting an example process for determining a potential intersection using one or more example models.

FIG. 5A is a first part of a flowchart depicting an example process 500 for determining a potential intersection using one or more example models. For example, some or all of the process 500 can be performed by one or more components in FIG. 4, as described herein. For example, some or all of the process 500 can be performed by the vehicle computing device 404 or the computing device 202.

At operation 502, the process may include receiving a first set of predicted trajectories associated with a first object and a second set of trajectories associated with a second object. In some examples, the operation 502 may include a vehicle computing device capturing sensor data from a lidar sensor, a radar sensor, and so on, of the vehicle 402. In some examples, the sensor data can be processed to determine a two-dimensional representation of the environment (e.g., top-down multi-channel data, vector data, an occupancy grid, etc.). The sensor data may be received from one or more sensors on the vehicle and/or from one or more remote sensors. In some examples, one or more trajectories can be predicted by a vehicle computing device (e.g., the prediction component 424) for each detected object in an environment surrounding the vehicle. The first set of predicted trajectories and/or the second set of predicted trajectories may be determined, for instance, by the prediction component 424.

The operation 502 may include, in some examples, determining that a first predicted trajectory and a second predicted trajectory associated with one or more objects are received from a CPU, and allocating the first predicted trajectory and the second predicted trajectory to a one or more GPUs by the memory allocation component 206.

At operation 504, the process may include determining, based on a first predicted trajectory of the first set and a second trajectory of the second set, a predicted intersection. In some examples, the operation 504 may include a vehicle computing device implementing the initialization component 204 (or different model) that is configured to predict, infer, estimate, or otherwise determine whether object trajectories intersect or interact with a trajectory of the vehicle. In various examples, a planned trajectory for the vehicle 102 can be received from the planning component 426 of the vehicle computing device 404 for use in determining an interaction between each detected object and the vehicle at various intersection points representing potential future positions of each object and the vehicle. For instance, the interaction component 208 can determine the intersection points 210, 212, 214, 216, 218, and/or 220. In various examples, the initialization component 204 can use the input data 106 (e.g., object state data associated with each object) to identify a first object (e.g., the object 112) that is most likely to reach an intersection point with the vehicle 102 before a second object (e.g., the object 110).

In some examples, the predicted intersection can be determined based at least in part on grid points associated with one or more occupancy grids (e.g., the grid 222). For instance, input data 106 can be processed by the active prediction component 104 to determine whether the objects in the environment are associated with one of the grid points of the occupancy grid, and a potential interaction for a future time can be determined based on the objects occupying a same grid point of the occupancy grid.

At operation 506, the process may include simulating a vehicle to perform a first action and a second action for a vehicle relative to at least the first predicted trajectory associated with the first object and the second trajectory associated with the second object. In some examples, the operation 506 may include determining the vehicle action 310 and the vehicle action 312 which represent an acceleration action, a braking action, a steering action, and the like, relative to the first predicted trajectory and the second predicted trajectory. The first action and/or the second action can represent possible states of the vehicle at different times in the future.

At operation 508, the process may include determining, based on the predicted intersection and a control policy, an updated predicted trajectory associated with at least one of the first object or the second object. In some examples, the operation 508 may include comparing a magnitude and a direction of the velocity or acceleration associated with the object to a magnitude and a direction of the velocity or acceleration associated with the vehicle. In various examples, the active prediction component 104 can implement the simulation component 302 comprising one or more machine learned models to determine which of the one or more object trajectories intersects with a vehicle trajectory, and update an object trajectory based on a control policy that includes logic for determining rules of the road for the objects and vehicle in the environment (e.g., which object has the right of way, which object responds to a traffic signal, speed bump, and so on).

Figure 5B:
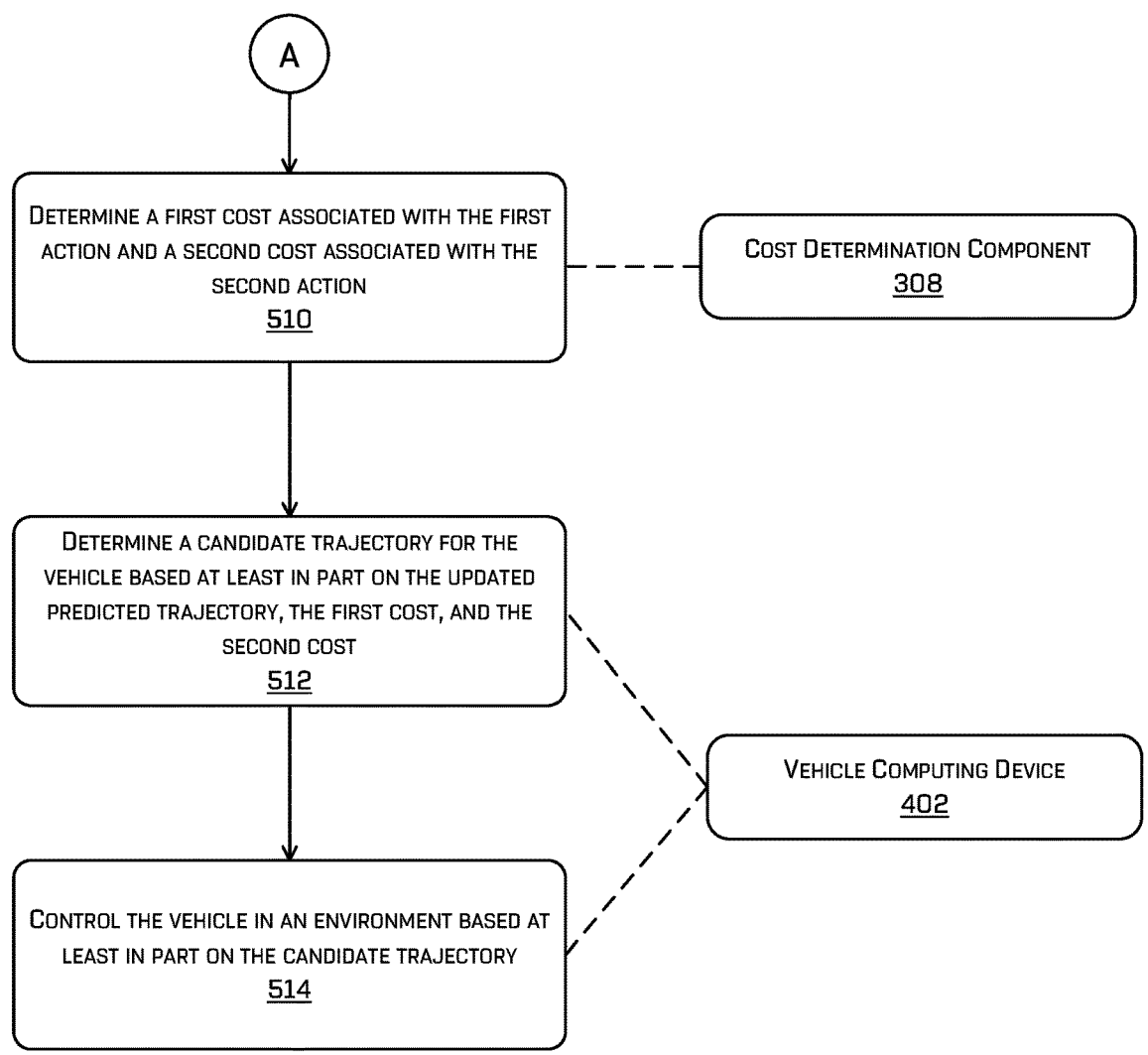
FIG. 5B is a second part of the flowchart depicting the example process for determining a potential intersection using one or more example models.

FIG. 5B is a second part of the flowchart depicting the example process for determining a potential intersection using one or more example models.

At operation 510, the process may include determining a first cost associated with the first action and a second cost associated with the second action. In some examples, the operation 510 may include the cost determination component 308 determining a reference cost, an obstacle cost, an acceleration cost, and/or a steering cost relative to each reference action. In some examples, the cost determination component 308 can also determine costs associated with object actions during scenarios implemented by the simulation component 302. In various examples, an action by the vehicle and/or an object can include a braking action to cause the vehicle to brake, a steering action to cause the vehicle to steer, or an acceleration action to cause the vehicle to accelerate, just to name a few.

At operation 512, the process may include determining a candidate trajectory for the vehicle based at least in part on the updated predicted trajectory, the first cost, and the second cost. In some examples, the operation 512 may include the active prediction component 104 generating a signal indicative of the potential interactions and associated costs for the vehicle to avoid a potential interaction with objects in the environment. In various examples, the active prediction component 104 can send the signal to other components of the vehicle computing device 404, such as the planning component 426 that causes the planning component 426 to generate a candidate trajectory for the vehicle to consider when navigating in the environment. In some examples, the operation 512 may include the planning component 426 utilizing the information associated with the first cost and the second cost to determine the candidate trajectory or other action for the vehicle to avoid the potential intersections between the objects and the vehicle.

At operation 514, the process may include controlling the vehicle in an environment based at least in part on the candidate trajectory. In some examples, the operation 514 may include controlling, by the vehicle computing device 404, the vehicle in an environment in the future based at least on the information from the active prediction component 104. In various examples, determinations of potential intersection(s) by the active prediction component 104 can be verified (e.g., does or does not occur at a future time) by processing additional input data over time that represents the object and the environment.

In various examples, process 500 may return to 502 after performing operation 514. In such examples, the vehicle may continuously monitor for potential collisions and update/modify decisions regarding whether to engage a safety system or not (which may, in at least some examples, include performing one or more maneuvers to mitigate or minimize an impact). In any of the examples described herein, the process may repeat with a given frequency and generate one or more occupancy grids associated with one or more multiple times in the future for making the determinations above.

FIGS. 5A and 5B illustrate example processes in accordance with examples of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted and/or combined in any order and/or in parallel to implement the processes.

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. In some examples, one or more operations of the method may be omitted entirely. For instance, the operations may include determining a first action and a second action by the vehicle relative to a selected trajectory without determining a respective cost for one or more of the actions by the vehicle. Moreover, the methods described herein can be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Example Clauses

Any of the example clauses in this section may be used with any other of the example clauses and/or any of the other examples or embodiments described herein.

A: A system comprising: one or more processors; and one or more non-transitory computer-readable media storing instructions executable by the one or more processors, wherein the instructions, when executed, cause the system to perform operations comprising: receiving a first set of predicted trajectories associated with a first object and a second set of trajectories associated with a second object; determining, based on a first predicted trajectory of the first set and a second trajectory of the second set, a predicted intersection; simulating a vehicle to perform a first action and a second action relative to at least the first predicted trajectory associated with the first object and the second trajectory associated with the second object; determining, based on the predicted intersection and a control policy, an updated predicted trajectory associated with at least one of the first object or the second object; determining a first cost associated with the first action and a second cost associated with the second action; determining a candidate trajectory for the vehicle based at least in part on the updated predicted trajectory, the first cost, and the second cost; and controlling the vehicle in an environment based at least in part on the candidate trajectory.

B: The system of paragraph A, wherein: the control policy indicates at least one of: a physics policy, a dynamics policy, a kinematics policy, or a right of way policy, the right of way policy associated with one or more of: a roadway, an intersection, or a surface navigable by the vehicle.

C: The system of either paragraph A or B, the operations further comprising: receiving map data of the environment; and determining the updated predicted trajectory further based at least in part on the map data.

D: The system of any one of paragraphs A-C, the operations further comprising: determining, based at least in part on the first predicted trajectory and the second trajectory, an occupancy grid comprising a plurality of grid points representing discretized portions of the environment; and determining the predicted intersection based at least in part on a first occupancy of the first object and a second occupancy of the second object at a grid point of the occupancy grid.

E: The system of any one of paragraphs A-D, the operations further comprising: inputting the first set of predicted trajectories and the second set of trajectories to a parallel processing unit; and determining the predicted intersection based at least in part on an output by the parallel processing unit.

F: A method comprising: receiving a first set of trajectories associated with a vehicle and a second set of predicted trajectories associated with an object; determining, based on a first trajectory of the first set and a second predicted trajectory of the second set, a predicted intersection; simulating an action for the vehicle to perform relative to the second predicted trajectory associated with the object; determining, based on the predicted intersection and a control policy, an updated predicted trajectory associated with the object; and determining a candidate trajectory for the vehicle based at least in part on the action and the updated predicted trajectory.

G: The method of paragraph F, further comprising: determining a cost associated with the action; and controlling the vehicle in an environment based at least in part on the cost.

H: The method of either paragraph F or G, further comprising: determining an action for the object to perform relative to the first trajectory associated with the vehicle.

I: The method of any one of paragraphs F-H, further comprising: determining an occupancy grid comprising a plurality of grid points representing discretized portions of an environment; and determining the predicted intersection between the first trajectory and the second predicted trajectory based at least in part on a first occupancy of the vehicle and a second occupancy of the object at a grid point of the occupancy grid.

J: The method of any one of paragraphs F-I, wherein determining the predicted intersection is based at least in part on state data associated with one or more of the vehicle or the object.

K: The method of any one of paragraphs F-J, further comprising: receiving map data of an environment of the vehicle; and determining, by a machine learned model, the updated predicted trajectory further based at least in part on the map data.

L: The method of any one of paragraphs F-K, wherein: the control policy indicates a rule associated with one or more of: a roadway, an intersection, or a surface navigable by the vehicle.

M: The method of any one of paragraphs F-L, wherein determining the updated predicted trajectory is further based at least in part on a tree search.

N: The method of any one of paragraphs F-M, further comprising: determining a plurality of combinations between the first set of trajectories associated with the vehicle and the second set of predicted trajectories associated with the object; and inputting the plurality of combinations to a parallel processing unit for processing.

O: The method of any one of paragraphs F-N, wherein the action is a first action is associated with a first time, and further comprising: simulating, based at least in part on the first action and the control policy, a second action for the vehicle at a second time after the first time.

P: The method of any one of paragraphs F-O, wherein the object is a first object, and further comprising: determining that the first object is associated with the predicted intersection at a first time; determining that a second object is associated with the predicted intersection at a second time after the first time; and determining the updated predicted trajectory associated with the first object or the second object based at least in part on the second object being associated with the predicted intersection at the second time.

Q: One or more non-transitory computer-readable media storing instructions executable by one or more processors, wherein the instructions, when executed, cause the one or more processors to perform operations comprising: receiving a first set of trajectories associated with a vehicle and a second set of predicted trajectories associated with an object; determining, based on a first trajectory of the first set and a second predicted trajectory of the second set, a predicted intersection; simulating an action for the vehicle to perform relative to the second predicted trajectory associated with the object; determining, based on the predicted intersection and a control policy, an updated predicted trajectory associated with the object; and determining a candidate trajectory for the vehicle based at least in part on the action and the updated predicted trajectory.

R: The one or more non-transitory computer-readable media of paragraph Q, further comprising: determining a cost associated with the action; and controlling the vehicle in an environment based at least in part on the cost.

S: The one or more non-transitory computer-readable media of either paragraph Q or R, the operations further comprising: determining a plurality of combinations between the first set of trajectories associated with the vehicle and the second set of predicted trajectories associated with the object; and inputting the plurality of combinations to a parallel processing unit for processing.

T: The one or more non-transitory computer-readable media of any one of paragraphs Q-S, wherein the control policy indicates at least one of: a physics policy, a dynamics policy, a kinematics policy, or a right of way policy, the right of way policy associated with one or more of: a roadway, an intersection, or a surface navigable by the vehicle.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. One or more non-transitory computer-readable media storing instructions executable by one or more processors, wherein the instructions, when executed, cause the one or more processors to perform operations comprising:
   determining, based at least in part on searching a first portion of a decision tree, a first set of predicted interactions between an autonomous vehicle traversing a first vehicle trajectory and a first object in an environment of the autonomous vehicle;
   determining, based at least in part on searching a second portion of the decision tree, a second set of predicted interactions between the autonomous vehicle traversing a second vehicle trajectory and the first object;
   determining, based at least in part on the first set of predicted interactions and the second set of predicted interactions, a predicted trajectory to control the autonomous vehicle;
   determining an updated predicted trajectory for the autonomous vehicle based on a predicted intersection point between the autonomous vehicle, the first object, and a second object; and
   controlling, based at least in part on the updated predicted trajectory, the autonomous vehicle in the environment to cause the autonomous vehicle to navigate in the environment relative to the first object and the second object.

2. The one or more non-transitory computer-readable media of claim 1, the operations further comprising:
   determining the first set of predicted interactions is based on searching a first set of nodes of the decision tree associated with a set of potential actions for the autonomous vehicle to perform.

3. The one or more non-transitory computer-readable media of claim 1, the operations further comprising:
   determining a cost associated with the predicted trajectory; and
   controlling the autonomous vehicle in the environment based at least in part on the cost.

4. The one or more non-transitory computer-readable media of claim 3, wherein:
   determining the cost is further based at least in part on determining whether an interaction of the first set of predicted interactions comprises a collision.

5. The one or more non-transitory computer-readable media of claim 1, the operations further comprising:
   modifying, as a modified control policy, a control policy based at least in part on an outcome of a simulation;
   determining an updated set of first predicted interactions based at least in part on the modified control policy; and
   determining an updated predicted trajectory to control the autonomous vehicle based at least in part on the updated set of first predicted interactions.

6. A system comprising:
   one or more processors; and
   one or more non-transitory computer-readable media storing instructions executable by the one or more processors, wherein the instructions, when executed, cause the system to perform operations comprising:
      determining, based at least in part on searching a first portion of a decision tree, a first set of predicted interactions between an autonomous vehicle traversing a first vehicle trajectory and a first object in an environment of the autonomous vehicle;
      determining, based at least in part on searching a second portion of the decision tree, a second set of predicted interactions between the autonomous vehicle traversing a second vehicle trajectory and the first object;
      determining, based at least in part on the first set of predicted interactions and the second set of predicted interactions, a predicted trajectory to control the autonomous vehicle;
      determining an updated predicted trajectory for the autonomous vehicle based on a predicted intersection point between the autonomous vehicle, the first object, and a second object; and
      controlling, based at least in part on the updated predicted trajectory, the autonomous vehicle in the environment to cause the autonomous vehicle to navigate in the environment relative to the first object and the second object.

7. The system of claim 6, the operations further comprising:
   determining the first set of predicted interactions is based on searching a first set of nodes of the decision tree associated with a set of potential actions for the autonomous vehicle to perform.

8. The system of claim 6, the operations further comprising:
   determining a cost associated with the predicted trajectory; and
   controlling the autonomous vehicle in the environment based at least in part on the cost.

9. The system of claim 8, wherein:
   determining the cost is further based at least in part on determining whether an interaction of the first set of predicted interactions comprises a collision.

10. The system of claim 6, wherein the decision tree comprises a first branch and a second branch, and the operations further comprising:
    exploring the first branch corresponding to a first action for the autonomous vehicle and the second branch corresponding to a second action for the autonomous vehicle.

11. A method comprising:
    determining, based at least in part on searching a first portion of a decision tree, a first set of predicted interactions between an autonomous vehicle traversing a first vehicle trajectory and a first object in an environment of the autonomous vehicle;
    determining, based at least in part on searching a second portion of the decision tree, a second set of predicted interactions between the autonomous vehicle traversing a second vehicle trajectory and the first object;
    determining, based at least in part on the first set of predicted interactions and the second set of predicted interactions, a predicted trajectory to control the autonomous vehicle;
    determining an updated predicted trajectory for the autonomous vehicle based on a predicted intersection point between the autonomous vehicle, the first object, and a second object; and controlling, based at least in part on the updated predicted trajectory, the autonomous vehicle in the environment to cause the autonomous vehicle to navigate in the environment relative to the first object and the second object.

12. The method of claim 11, further comprising:
determining the first set of predicted interactions is based on searching a first set of nodes of the decision tree associated with a set of potential actions for the autonomous vehicle to perform.

13. The method of claim 11, further comprising:
determining a cost associated with the predicted trajectory; and
controlling the autonomous vehicle in the environment based at least in part on the cost.

14. The method of claim 13, wherein:
determining the cost is further based at least in part on determining whether an interaction of the first set of predicted interactions comprises a collision.

15. The method of claim 11, wherein determining the first set of predicted interactions comprises:
simulating a preliminary interaction between the autonomous vehicle and the first object to determine an intersection point;
modifying a control policy associated with the autonomous vehicle to generate a modified control policy; and
determining, as the first set of predicted interactions and based at least in part on the modified control policy and the predicted trajectory, an updated set of first predicted interactions.

16. The method of claim 11, further comprising:
determining an occupancy grid comprising a plurality of grid points representing discretized portions of the environment; and
determining the first set of predicted interactions or the second set of predicted interactions is based at least in part on a first occupancy of the autonomous vehicle and a second occupancy of the first object at a grid point of the occupancy grid.

17. The method of claim 11, wherein the decision tree comprises a first branch and a second branch, and further comprising:
exploring the first branch corresponding to a first action for the autonomous vehicle and the second branch corresponding to a second action for the autonomous vehicle.

18. The method of claim 11, further comprising:
receiving state data associated with the first object,
wherein determining the first set of predicted interactions or the second set of predicted interactions is further based at least in part on the state data.

19. The method of claim 11, wherein:
determining the predicted trajectory is further based at least in part on a control policy indicative of at least one of: a physics policy, a dynamics policy, a kinematics policy, or a right of way policy, the right of way policy associated with one or more of: a roadway, an intersection, or a surface navigable by the autonomous vehicle.

* * * * *